United States Patent
Kaneko

(10) Patent No.: US 9,045,115 B2
(45) Date of Patent: Jun. 2, 2015

(54) PARKING LOCK DEVICE

(75) Inventor: Yutaro Kaneko, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 813 days.

(21) Appl. No.: 13/202,191

(22) PCT Filed: Mar. 8, 2010

(86) PCT No.: PCT/JP2010/054271
§ 371 (c)(1),
(2), (4) Date: Aug. 18, 2011

(87) PCT Pub. No.: WO2010/104189
PCT Pub. Date: Sep. 16, 2010

(65) Prior Publication Data
US 2012/0041661 A1 Feb. 16, 2012

(30) Foreign Application Priority Data
Mar. 9, 2009 (JP) .................. 2009-054962

(51) Int. Cl.
G06F 7/70 (2006.01)
B60T 1/06 (2006.01)
F16H 63/34 (2006.01)
F16H 63/48 (2006.01)

(52) U.S. Cl.
CPC ............ B60T 1/062 (2013.01); F16H 63/3416 (2013.01); F16H 63/483 (2013.01); Y02T 10/7258 (2013.01)

(58) Field of Classification Search
CPC combination set(s) only.
See application file for complete search history.

(56) References Cited

U.S. PATENT DOCUMENTS

| | | | |
|---|---|---|---|
| 6,367,589 B1 * | 4/2002 | Lausch et al. ............... | 188/31 |
| 2002/0189383 A1 * | 12/2002 | Schamscha ............... | 74/340 |
| 2003/0125859 A1 * | 7/2003 | Dix et al. ............... | 701/50 |
| 2004/0060753 A1 * | 4/2004 | Ito et al. ............... | 180/65.2 |
| 2005/0082096 A1 * | 4/2005 | Oono ............... | 180/65.2 |
| 2006/0173584 A1 * | 8/2006 | Einig et al. ............... | 701/1 |
| 2006/0196712 A1 * | 9/2006 | Toyota et al. ............... | 180/165 |
| 2008/0033617 A1 * | 2/2008 | Watanabe et al. ............... | 701/48 |
| 2008/0127772 A1 * | 6/2008 | Sauter et al. ............... | 74/575 |
| 2008/0262687 A1 * | 10/2008 | Fujita et al. ............... | 701/70 |
| 2009/0176619 A1 * | 7/2009 | Inoue ............... | 477/96 |
| 2009/0326767 A1 * | 12/2009 | Kamada et al. ............... | 701/48 |

FOREIGN PATENT DOCUMENTS

| | | |
|---|---|---|
| CN | 1976835 A | 6/2007 |
| DE | 199 43 519 A1 | 3/2001 |
| DE | 10 2007 001 495 A1 | 7/2008 |

(Continued)

Primary Examiner — Jonathan L Sample
(74) Attorney, Agent, or Firm — Foley & Lardner LLP

(57) ABSTRACT

A rotation of a right wheel (3RR) and a rotation of a left wheel (3RL) of a vehicle are locked respectively by independent parking lock mechanisms (6). Each parking lock mechanism (6) comprises a locking operation prevention mechanism (63c, 63d) which mechanically prevents the locking operation of the parking lock mechanism (6) when a wheel rotation speed exceeds a predetermined parking lock prevention wheel rotation speed. The controller (CU, 10) is programmed to prevent the locking operation of the parking lock mechanisms (6) of the right and left wheels (3RR, 3RL) when a predetermined parking lock permitting condition based on wheel rotation speeds of the right wheel (3RR) and the left wheel (3RL) is not satisfied, thereby preventing a state in which one of the right and left wheels (3RR, 3RL) is prevented from rotating while the other is not prevented from rotating.

8 Claims, 13 Drawing Sheets

(56) References Cited

FOREIGN PATENT DOCUMENTS

| JP | 2005-348467 A | | 12/2005 |
|----|---------------|---|---------|
| JP | 2006-44458 A | | 2/2006 |
| JP | 2006044458 A | * | 2/2006 |
| JP | 2008-290562 A | | 12/2008 |
| WO | WO 2006/025217 A1 | | 3/2006 |

* cited by examiner 1R, 1L ELECTRIC MOTOR
2R, 2L GEAR
4 INVERTER
5R, 5L WHEEL ROTATION SPEED SENSOR
6 PARKING LOCK MECHANISM
10 PARKING LOCK OPERATION CONTROL PART
MCV MOTOR CONTROLLER
S1 STEERING ANGLE SENSOR
S2 ACCELERATOR PEDAL DEPRESSION SENSOR
S3 BRAKE PEDAL DEPRESSION SENSOR
S4 MODE SELECTION SWITCH
S5 YAW RATE SENSOR
S6 LATERAL ACCELERATION SENSOR
S7 FRONT-AFT ACCELERATION SENSOR

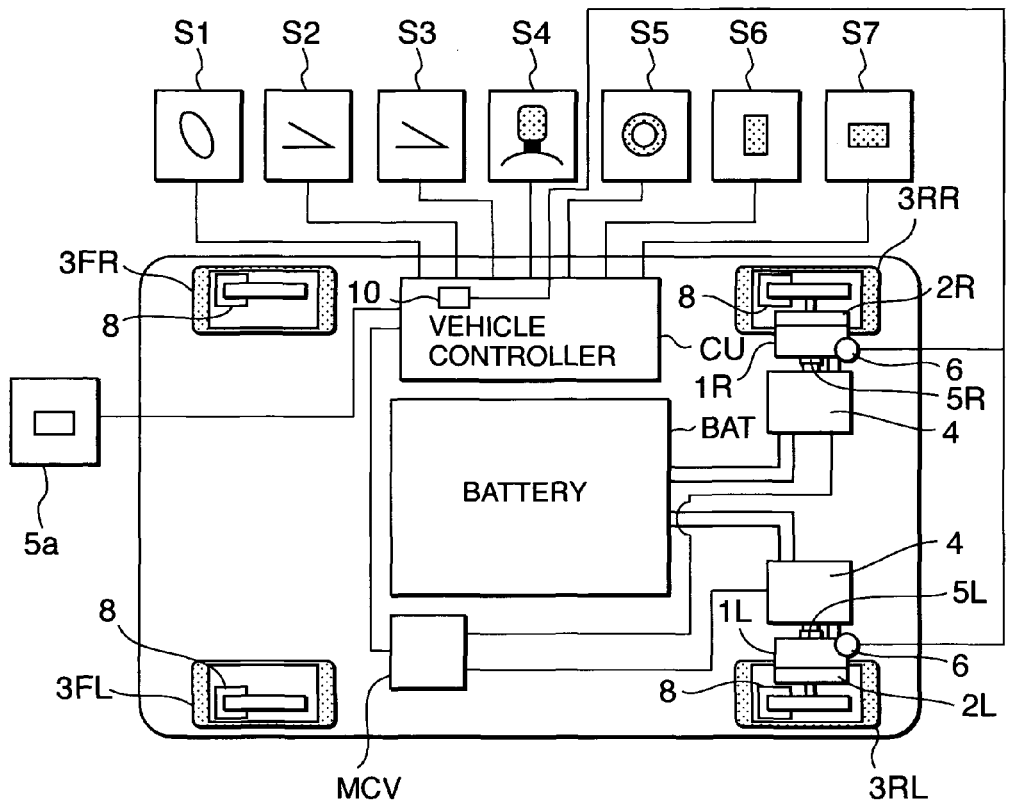

1R, 1L ELECTRIC MOTOR
2R, 2L GEAR
4 INVERTER
5a VEHICLE SPEED SENSOR
5R, 5L WHEEL ROTATION SPEED SENSOR
6 PARKING LOCK MECHANISM
10 PARKING LOCK OPERATION CONTROL PART
MCV MOTOR CONTROLLER
S1 STEERING ANGLE SENSOR
S2 ACCELERATOR PEDAL DEPRESSION SENSOR
S3 BRAKE PEDAL DEPRESSION SENSOR
S4 MODE SELECTION SWITCH
S5 YAW RATE SENSOR
S6 LATERAL ACCELERATION SENSOR
S7 FRONT-AFT ACCELERATION SENSOR

FIG. 7

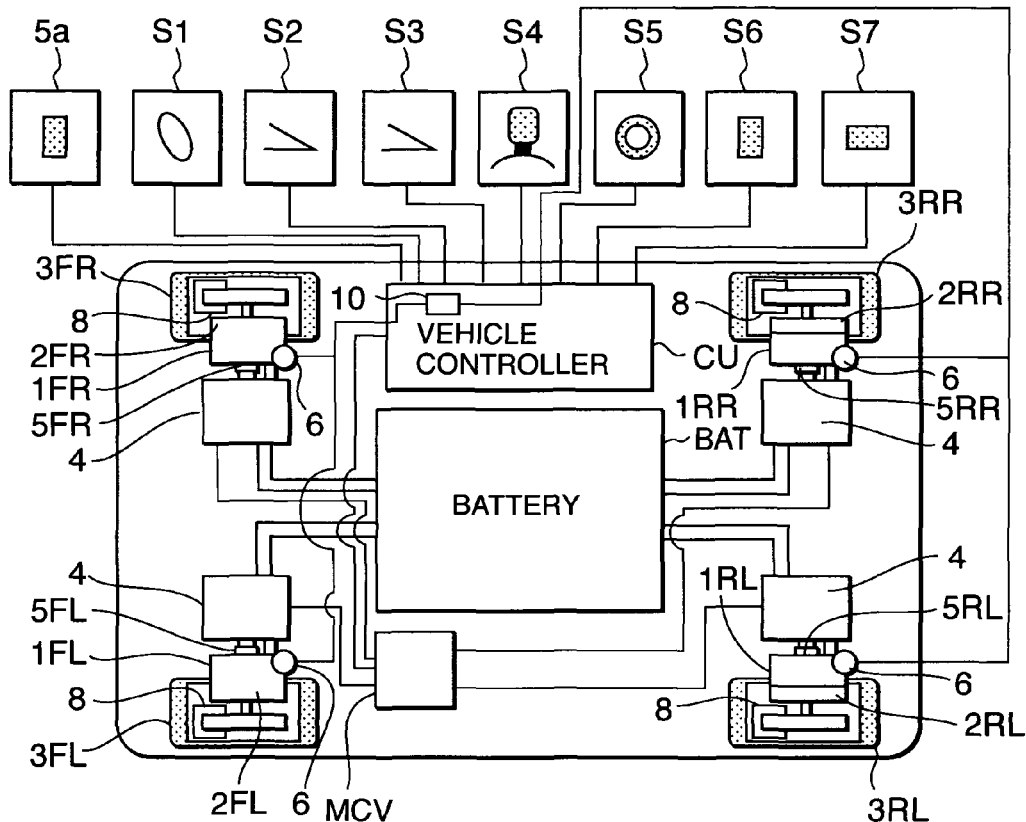

1FR, 1FL, 1RR, 1RL ELECTRIC MOTOR
2FR, 2FL, 2RR, 2RL GEAR
4 INVERTER
5a VEHICLE SPEED SENSOR
5FR, 5FL, 5RR, 5RL WHEEL ROTATION SPEED SENSOR
6 PARKING LOCK MECHANISM
10 PARKING LOCK OPERATION CONTROL PART
MCV MOTOR COTROLLER
S1 STEERING ANGLE SENSOR
S2 ACCELERATOR PEDAL DEPRESSION SENSOR
S3 BRAKE PEDAL DEPRESSION SENSOR
S4 MODE SELECTION SWITCH
S5 YAW RATE SENSOR
S6 LATERAL ACCELERATION SENSOR
S7 FRONT-AFT ACCELERATION SENSOR

FIG. 12

PARKING LOCK DEVICE

FIELD OF THE INVENTION

This invention relates to control of a parking lock mechanism for a vehicle.

BACKGROUND OF THE INVENTION

JP2005-348467A, published by the Japan Patent Office in 2005 discloses a parking lock device for an electric-drive vehicle that has right and left drive wheels, each of which is driven by an electric motor. Each of the right and left drive wheels is provided with a ratchet wheel that rotates together with the electric motor. Grooves are formed in an outer circumference of the ratchet wheel at equal angular intervals.

The parking lock device is provided with a parking pawl having a base end pivoted on a shaft and an actuator which causes the parking pawl to turn around the shaft. A projection is formed on a tip of the parking pawl. By turning the parking pawl about the shaft, the projection engages with a groove of the ratchet wheel, thereby preventing the drive wheel from rotating.

SUMMARY OF THE INVENTION

The parking lock device is required not to become active when the vehicle is running. For this purpose, the turning force applied to the parking pawl is limited so that the projection is bounced by the teeth of the rotating ratchet wheel and does not engage with the groove when the actuator turns the parking pawl in a state where a wheel rotation speed is higher than a predetermined rotation speed.

However, when the parking lock device is activated in a state where a rotation speed of one of the right and left drive wheels exceeds the predetermined speed while a rotation speed of the other drive wheel is within the predetermined speed due to road surface conditions, for example, the rotation of the one of the drive wheels becomes locked while the rotation of the other drive wheel is not locked. Such discordance with respect to the locking state of the right and left drive wheels may promote unstable vehicle behavior.

Further, when both of the rotation speeds of the right and left drive wheels are within the predetermined speed, there may still be a difference between the rotation speeds of the drive wheels due to road surface conditions. In this case, rotation of both drive wheels can be locked by activating the parking lock device. However, when there is a large difference between the wheel rotation speeds, a discrepancy arises inevitably in the timings at which the wheels are locked, leading likewise to unstable vehicle behavior.

It is therefore an object of this invention to ensure a stable vehicle behavior when the parking lock mechanism is activated to lock rotation of the right and left drive wheels.

To achieve the above object, this invention provides a parking lock device for a vehicle having a right wheel and a left wheel, comprising a right parking lock mechanism which locks rotation of the right wheel, a left parking lock mechanism which locks rotation of the left wheel, a sensor which detects a wheel rotation speed of the right wheel, a sensor which detects a wheel rotation speed of the left wheel, and a programmable controller which controls operations of the right and left parking lock mechanisms.

The right parking lock mechanism comprises a right inactivating mechanism that mechanically inactivates a locking operation of the right parking lock mechanism when a rotation speed of the right wheel exceeds a predetermined parking lock prevention wheel rotation speed. The left parking lock mechanism comprises a left inactivating mechanism that mechanically inactivates a locking operation of the right parking lock mechanism when a rotation speed of the left wheel exceeds the predetermined parking lock prevention wheel rotation speed.

The controller is programmed to determine whether or not a predetermined parking lock permitting condition is established on the basis of the rotation speed of the right wheel and the rotation speed of the left wheel, and prevent the right parking lock mechanism and the left parking lock mechanism from becoming active until the predetermined parking lock permitting condition is established.

The details as well as other features and advantages of this invention are set forth in the remainder of the specification and are shown in the accompanying drawings.

BRIEF DESCRIPTION OF THE DRAWINGS

FIG. 7 is a schematic diagram of an electric-drive vehicle provided with a parking lock device according to a third embodiment of this invention.

FIG. 12 is a schematic diagram of an electric-drive vehicle provided with a parking lock device according to a sixth embodiment of this invention.

DESCRIPTION OF THE PREFERRED EMBODIMENTS

Figure 1:
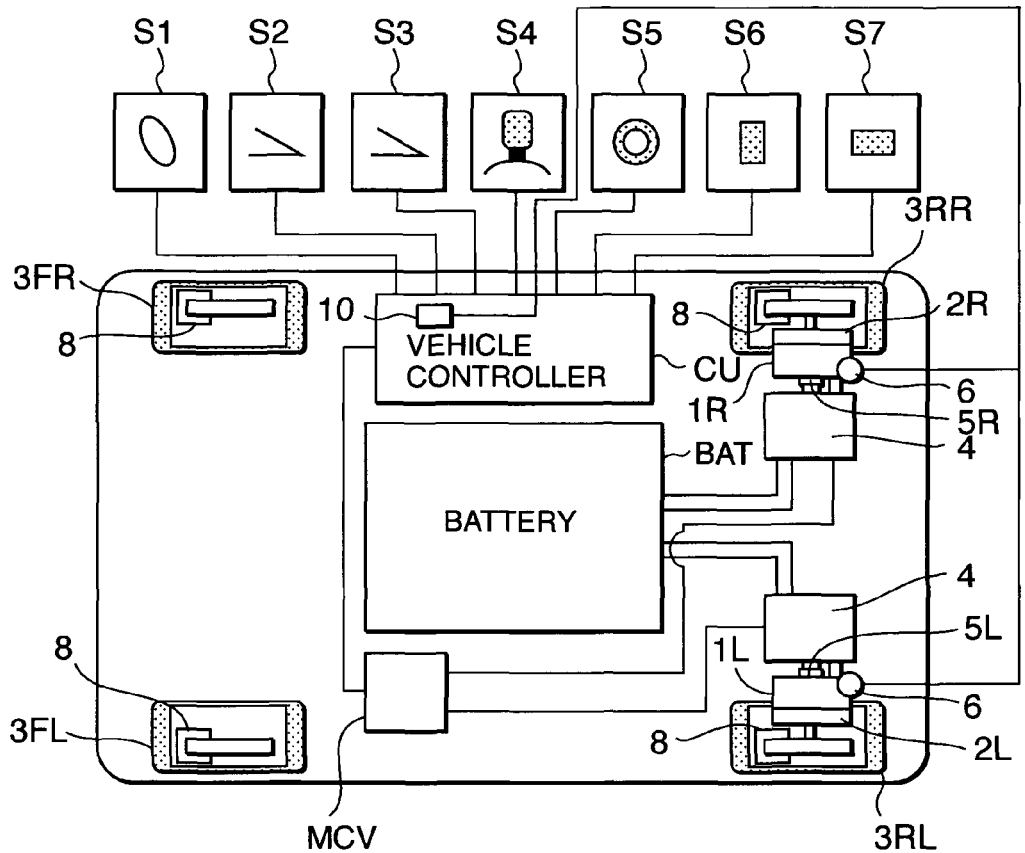
FIG. 1 is a schematic diagram of an electric-drive vehicle provided with a parking lock device according to a first embodiment of this invention.

Referring to FIG. 1 of the drawings, a rear drive type electric-drive vehicle which runs using electric power supplied from a battery BAT comprises a right front wheel 3FR, a left front wheel 3FL, a right rear wheel 3RR, and a left rear wheel 3RL. This invention may however be applied to a front drive vehicle or a four-wheel drive vehicle rather than a rear drive vehicle.

The right rear wheel 3RR is connected to an electric motor 1R via a gear 2R. The left rear wheel 3RL is connected to an electric motor 1L via a gear 2L. The electric motor 1R (1L) rotates in accordance with an electric power supplied from the battery BAT via an inverter 4 and drives the right rear wheel 3RR (left rear wheel 3RL) to rotate via the gear 2R (2L).

A brake rotor is fixed to each of the wheels 3FR, 3FL, 3RR, 3RL. A friction brake 8 applies a braking force to the brake rotor of each of the wheels 3FR, 3FL, 3RR, 3RL.

Each of the right rear wheel 3RR and the left rear wheel 3RL is provided with a parking lock mechanism 6.

The parking lock mechanism 6 functions to prevent the wheel 3RR (3RL) from rotating against a rotation torque input from the electric motor 1R (1L) or a rotation torque input from a road surface.

Figure 2:
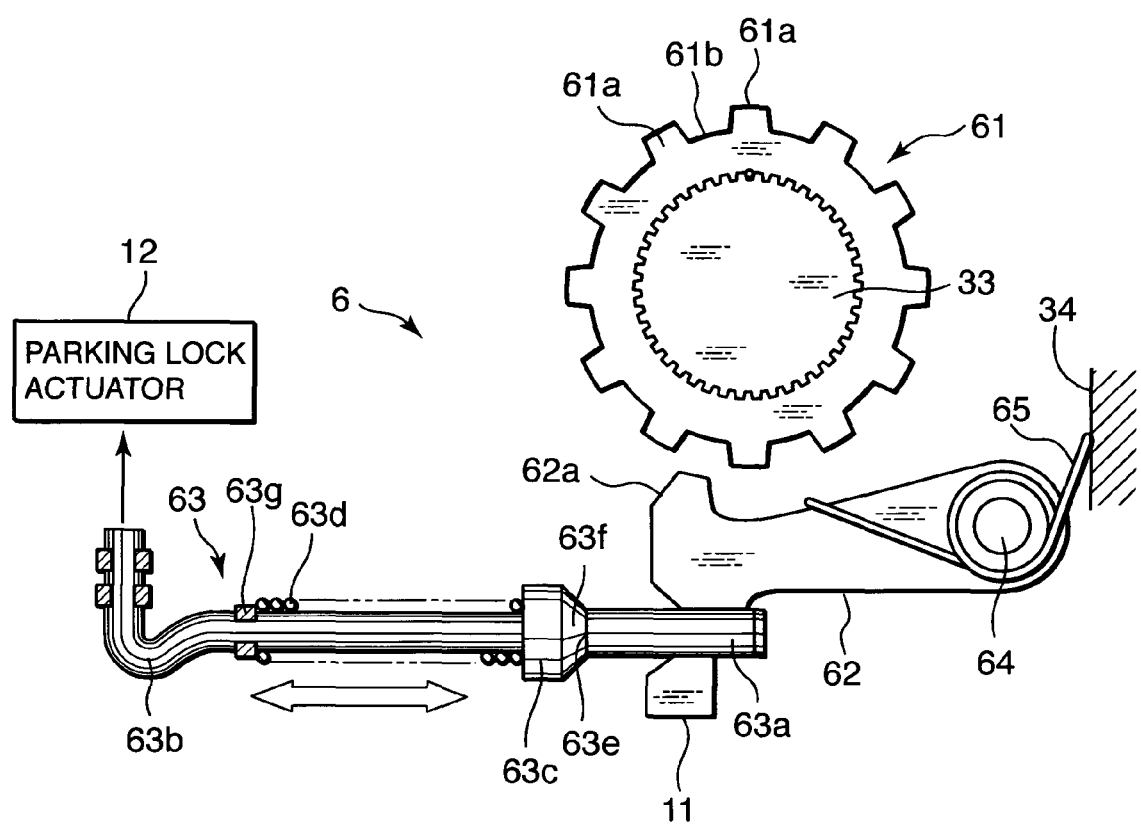
FIG. 2 is a side view of a parking lock mechanism in an unlock state according to the first embodiment of this invention.

Referring to FIG. 2, the parking lock mechanism 6 comprises a ratchet wheel 61, a parking pawl 62, a parking rod 63, and a parking lock actuator 12.

The ratchet wheel 61 is fixed onto an outer circumference of a rotation shaft 33 of the electric motor 1R (1L), thereby rotating together with the electric motor 1R (1L).

The ratchet wheel 61 comprises teeth 61a formed in an outer circumference thereof at equal angular intervals. A groove 61b is formed between adjacent teeth 61a. The parking pawl 62 is a lever-like member, a base end of which is pivoted on a shaft 64 supported by a case 34 of the electric motor 1R (1L). A projection 62a is formed at a tip of the parking pawl 62 so as to project towards the ratchet wheel 61. The parking pawl 62, by turning around the shaft 64, causes the projection 62a to engage with one of the grooves 61b, thereby preventing the ratchet wheel 61 from rotating in any rotation direction.

The parking pawl 62 is biased by a torsion spring 65 supported by the case 34 towards a turning direction to release the projection 62a from engagement with the groove 61b, or in other words in an unlocking direction.

The parking rod 63 is driven by the parking lock actuator 12 to displace in right and left directions in the figure. The parking rod 63 comprises a tip portion 63a and a base portion 63b.

The tip portion 63a is wedged between a support 11 fixed to the case 34 and the parking pawl 62 biased by the torsion spring 65 in the unlocking direction.

The base portion 63b is connected to the parking lock actuator 12 via a link mechanism. The parking lock actuator 12 is constituted by an electric-drive or hydraulic type rotary actuator, for example. The link mechanism converts a rotation of the parking lock actuator 12 into a linear motion of the parking rod 63. The tip portion 63a is formed to have a larger diameter than the base portion 63b and a step 63e is formed at a boundary there-between.

A pusher 63c is fitted onto an outer circumference of the base portion 63b so as to be free to slide along the base portion 63b. The pusher 63c comprises a tapered face 63f which gradually decreases in diameter towards a tip.

A coil spring 63d is fitted onto the outer circumference of the base portion 63b to bias the pusher 63c towards the tip portion 63b. An end of the coil spring 63d is in contact with the pusher 63c on the opposite side thereof to the tapered face 63f and another end of the coil spring 63d is supported by a spring seat 63g which is fixed to the outer circumference of the base portion 63b. The step 63e functions as a stopper to stop the pusher 63c moving towards the tip portion 63a. An inclined surface is formed on each of the parking pawl 62 and the support 11 so as to face the tapered face 63f.

In the figure, the pusher 63c is detached from the parking pawl 62 and the support 11 and the parking pawl 62 biased by the torsion spring 65 in the unlocking direction grips the tip portion 63a of the parking rod 63. In this state, the projection 62a of the parking pawl 62 is not engaged with the groove 61b of the ratchet wheel 61, and the ratchet wheel 61 is allowed to rotate arbitrarily. This state corresponds to an unlock state of the parking lock mechanism 6.

Figure 3:
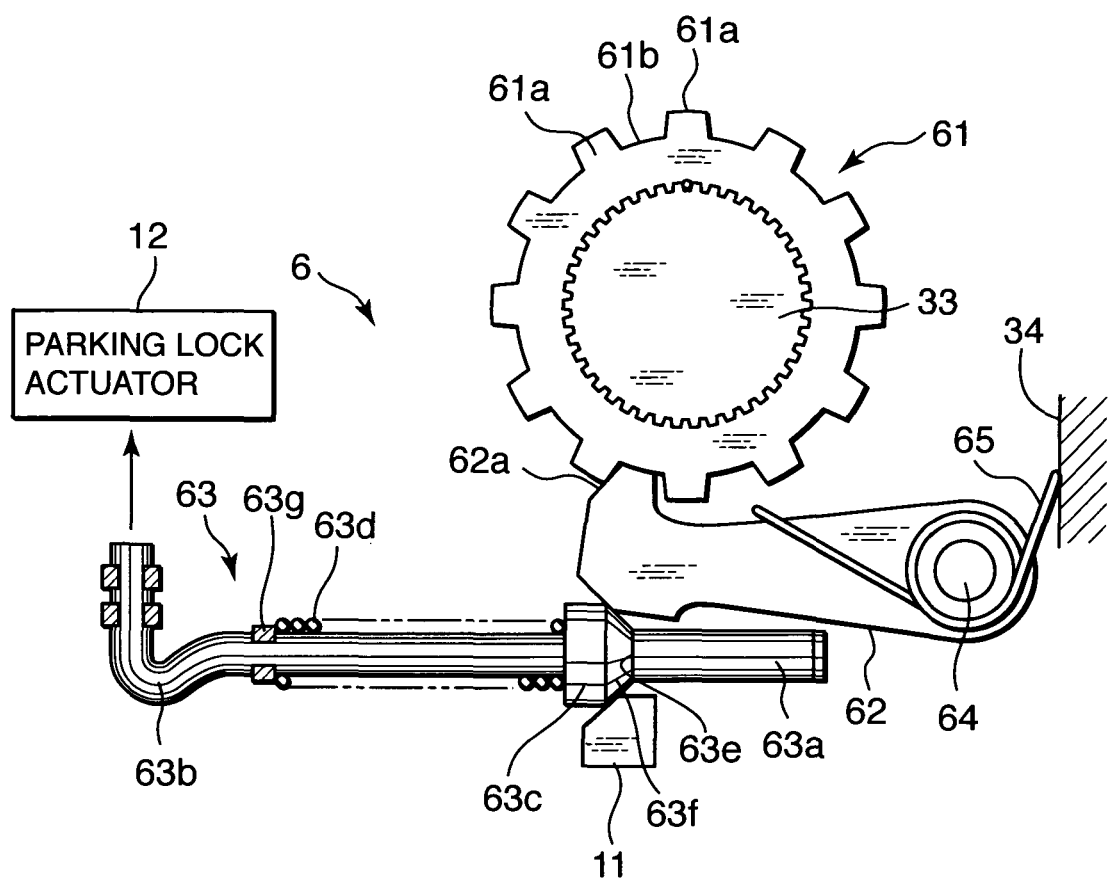
FIG. 3 is a side view of the parking lock mechanism in a lock state.

Referring to FIG. 3, when the parking lock actuator 12 drives the parking rod 63 in a linear direction, the pusher 63c is wedged between the inclined surfaces of the parking pawl 62 and the support 11 so as to turn the parking pawl 62 against the torsion spring 65 in a clockwise direction in the figure. As a result, the projection 62a of the parking pawl 62 engages with one of the grooves 61b of the ratchet wheel 61. In this state, the rotation shaft 33 is firmly locked and cannot rotate even when a rotation torque of the electric motor 1R (1L) or a rotation torque input from a road surface into the wheel 3RR (3RL) is exerted on the rotation shaft 33. This state corresponds to a lock state of the parking lock mechanism 6.

The reason why the pusher 63c is not fixed to the parking rod 63 but supported by the coil spring 63d is to limit a turning force which is exerted on the parking pawl 62 by the pusher 63c. In a state where a wheel rotation speed of the wheel 3RR (3RL) is higher than a predetermined parking lock prevention wheel rotation speed, when the parking lock actuator 12 applies a driving force on the parking rod 63 in a locking direction, the projection 62a of the parking pawl 62 is bounced by the teeth 61a of the rotating ratchet wheel 61 and prevented from engaging with one of the grooves 61b. The pusher 63c is thereby pushed back in the unlock direction against the biasing force of the coil spring 63d.

As described above, by using the coil spring 63d to support the pusher 63c on the parking rod 63 resiliently, the parking lock mechanism 6 is prevented from being activated at a wheel rotation speed exceeding the predetermined parking lock prevention wheel rotation speed irrespective of the driving force of the parking lock actuator 12. Preventing the parking lock mechanism 6 from being activated at a wheel rotation speed exceeding the predetermined parking lock prevention wheel rotation speed is preferable in terms of ensuring stability of vehicle behavior and protecting the parking lock mechanism 6. The predetermined parking lock prevention wheel rotation speed can be set arbitrarily by modifying a spring load of the coil spring 63d. Herein, the predetermined parking lock prevention wheel rotation speed is set at ten kilometers per hour (10 km/hr).

Referring again to FIG. 1, the operation of the parking lock actuator 12 is controlled by a parking lock operation control part 10 in a vehicle controller CU. It should be noted that the parking lock operation control part 10 is a virtual unit for the purpose of describing a special function of the vehicle controller CU, and does not exist as a physical entity.

The vehicle controller CU controls a driving force, a braking force, and steering of the vehicle. For this purpose, detection signals are input into the vehicle controller CU from a wheel rotation speed sensor 5R that detects a wheel rotation speed of the right rear wheel 3RR, a wheel rotation speed sensor 5L that detects a wheel rotation speed of the left rear wheel 3RL, a steering angle sensor S1 that detects a steering angle of the vehicle, an accelerator pedal depression sensor S2 that detects a depression amount of an accelerator pedal depressed by a driver of the vehicle, a brake pedal depression sensor S3 that detects a depression amount of a brake pedal depressed by the driver, a mode selection switch S4 that detects a running mode or a shift lever position designated by the driver, a yaw rate sensor S5 that detects a yaw rate of the vehicle, a lateral acceleration sensor S6 that detects a lateral acceleration of the vehicle, and a front-aft acceleration sensor S7 that detects a front-aft acceleration of the vehicle.

With respect to driving force control of the vehicle, the vehicle controller CU calculates, on the basis of the input signals, torque command values for the electric motors 1R and 1L, and inputs the calculated torque command values into a motor controller MCU. The motor controller MCU outputs command signals corresponding to the torque command values to the inverters 4 connected to the electric motors 1R and 1L, respectively. The inverter 4 supplies electric power corresponding to the command signal from the battery BAT to the electric motor 1R (1L).

The vehicle controller CU is constituted by a microcomputer comprising a central processing unit (CPU), a read-only memory (ROM), a random access memory (RAM), and an input/output interface (I/O interface). The controller may be constituted by a plurality of microcomputers. The motor controller MCU is constituted by a similar microcomputer. It is possible to constitute one or both of the vehicle controller CU and the motor controller MCU by plural microcomputers. It is also possible to constitute the vehicle controller CU and the motor controller MCU by one sole microcomputer.

The parking lock operation control part 10 serving as a function of the vehicle controller CU controls operations of the parking lock actuator 12.

Figure 4:
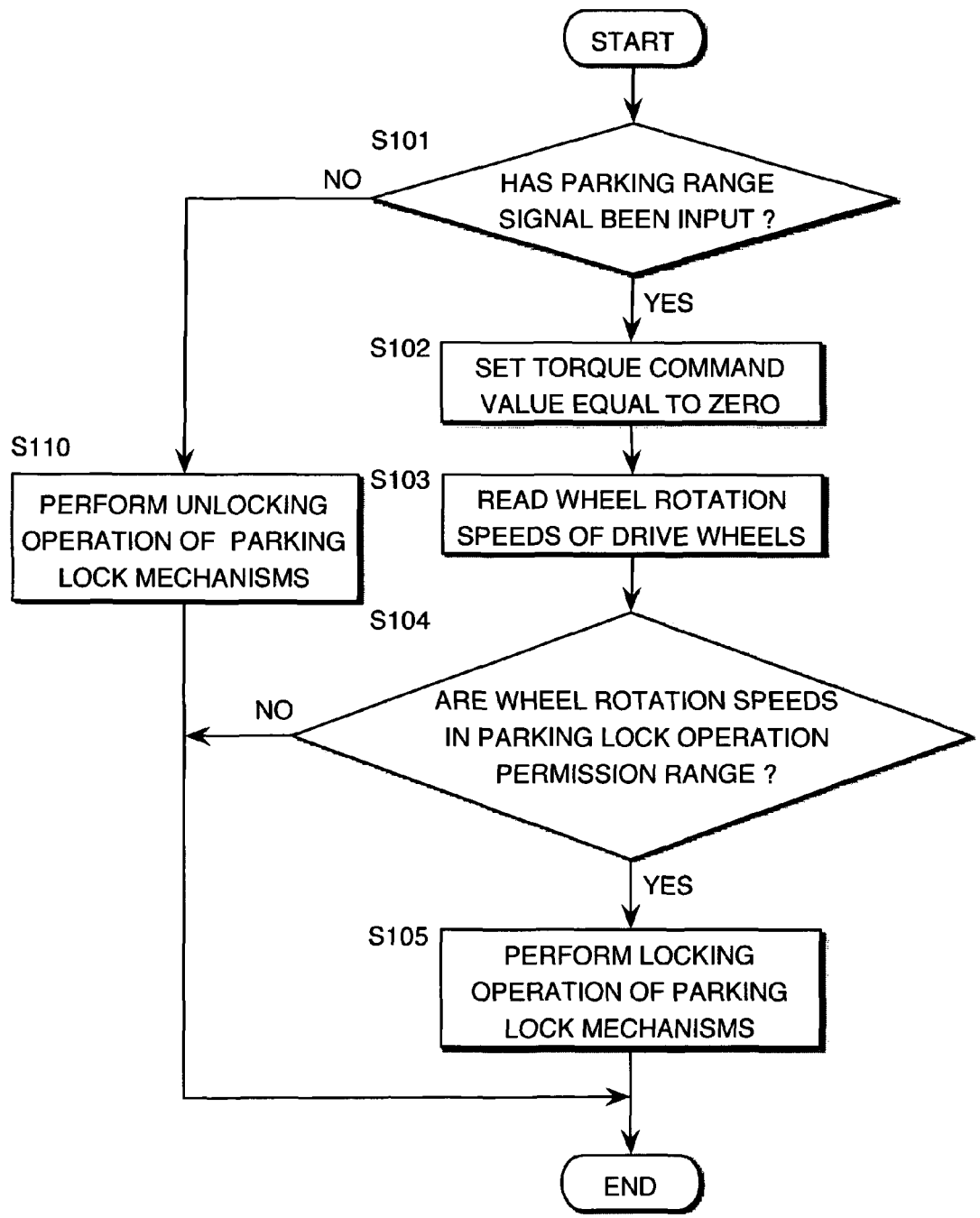
FIG. 4 is a flowchart describing a parking lock operation routine performed by a controller according to the first embodiment of this invention.

Referring to FIG. 4, a parking lock operation routine performed by the parking lock operation control part 10 will be described. The parking lock operation control part 10 performs this routine at regular time intervals, ten milliseconds, for example, while the vehicle is running.

In a step S101, the parking lock operation control part 10 determines if a parking range signal has been input from the mode selection switch S4. The parking range signal is a signal generated by the mode selection switch S4 and input into the parking lock operation control part 10 every time the shift lever shifts to the parking range.

When the determination in the step S101 is negative, or in other words when the shift lever has not shifted to the parking range, the parking lock operation control part 10 performs an unlocking operation of the parking lock mechanism 6 in a step S110. Specifically, the parking lock operation control part 10 outputs a signal to the parking lock actuator 12 to make the parking pawl 62 turn to or stay in the unlock state shown in FIG. 2. After the processing, the parking lock operation control part 10 terminates the routine.

When on the other hand the determination in the step S101 is affirmative, or in other words when the shift lever has shifted to the parking range, the parking lock operation control part 10 performs a locking operation of the parking lock mechanism 6 in steps S102-S105.

In the step S102, the parking lock operation control part 10 sets the torque command values for the electric motors 1R and 1L equal to zero. The motor controller MCU outputs command signals corresponding to the torque command values equal to zero to the inverters 4 so as to cut off the electric power supply from the battery BAT to the electric motors 1R and 114, respectively. The reason why the electric power supply to the electric motors 1R and 1L is cut off is that the operation of the electric motors 1R and 1L is not necessary when the parking lock mechanisms 6 are activated.

In the step S103, the parking lock operation control part 10 reads the wheel rotation speed of the right rear wheel 3RR detected by the wheel rotation speed sensor 5R and the wheel rotation speed of the left rear wheel 3RL detected by the wheel rotation speed sensor 5L.

Figure 5:
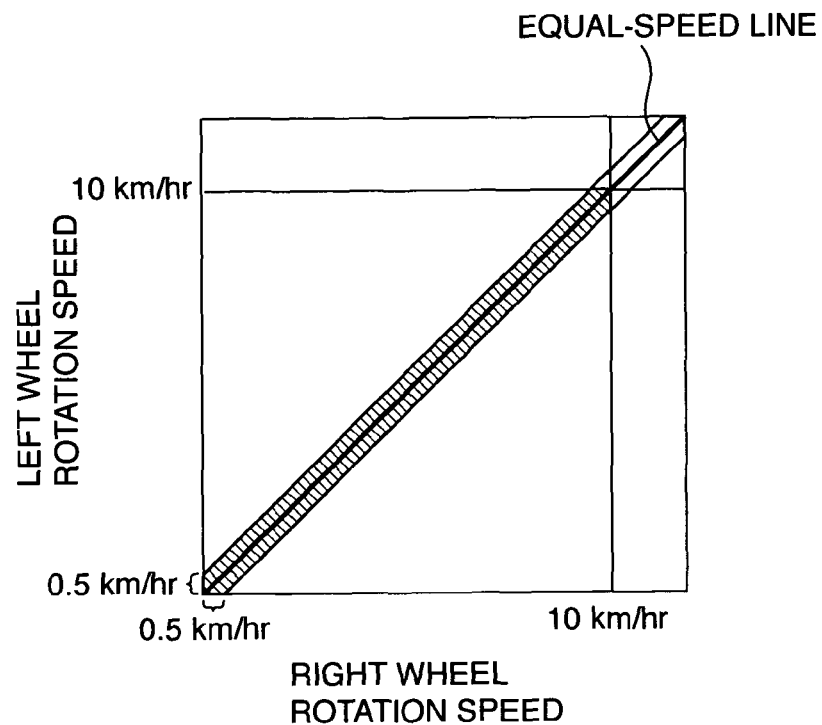
FIG. 5 is a diagram showing characteristics of a parking lock operation permission range map stored by the controller.

In the step S104, the parking lock operation control part 10 refers to a map stored previously in the ROM of the vehicle controller CU. The characteristics of the map are shown in FIG. 5. By referring to this map, the parking lock operation control part 10 determines if a point corresponding to the wheel rotation speed of the right rear wheel 3RR and the wheel rotation speed of the left rear wheel 3RL resides in a hatched zone in the figure. Herein, the hatched zone is set on both sides of a center line at which the rotation speed of the right rear wheel 3RR and the rotation speed of the left rear wheel 3RL are equal.

The hatched zone has a band width of 0.5 km/hr on both sides of the center line. The hatched zone is limited by the predetermined parking lock prevention wheel rotation speed of 10 km/hr that is determined based on the spring load of the coil spring 63d, thereby limiting the rotation speed of the right rear wheel 3RR and the rotation speed of the left rear wheel 3RL not to exceed the predetermined parking lock prevention wheel rotation speed of 10 km/hr. This zone is referred to as a parking lock operation permission range.

As a result, when both the rotation speed of the right rear wheel 3RR and the rotation speed of the left rear wheel 3RL are within 10 km/hr and the deviation there-between is within 0.5 km/hr, the determination of the step S104 is affirmative. In other cases, the determination of the step S104 is negative.

When the determination in the step S104 is affirmative, the parking lock operation control part 10 performs processing of the step S105. When the determination in the step S104 is negative, the parking lock operation control part 10 immediately terminates the routine without performing a locking operation of the parking lock mechanisms 6.

In the step S105, the parking lock operation control part 10 performs a locking operation of the parking lock mechanisms 6. Specifically, by outputting signals to the parking lock actuators 12, the parking lock operation control part 10 operates the parking lock mechanisms 6 to the lock state as shown in FIG. 3. After performing the processing of the step S105, the parking lock operation control part 10 terminates the routine.

By performing the above routine at regular time intervals, the locking operation of the parking lock mechanism 6 is performed upon detecting a shift of the shift lever to the parking range and the unlock operation of the parking lock mechanism 6 is performed upon detecting a shift of the shift lever to another range.

This parking lock operation routine, with reference to a map having the characteristics shown in FIG. 5, defines a permitting condition of the locking operation of the parking lock mechanism 6 as follows.

(1) Both of the rotation speeds of the right rear wheel 3RR and the left rear wheel 3RL are within the predetermined parking lock prevention wheel rotation speed of 10 km/hr, and (2) a difference between the rotation speed of the right rear wheel 3RR and the rotation speed of the left rear wheel 3RL is within a predetermined difference of 0.5 km/hr.

For example, even when the vehicle is running straight forward, the rotation speed of the right rear wheel 3RR does not necessarily coincide with the rotation speed of the left rear wheel 3RL due to a difference in friction factors of the road surface. It is therefore possible that the rotation speed of the right rear wheel 3RR exceeds the predetermined parking lock prevention wheel rotation speed of 10 km/hr, which is determined on the basis of the aforesaid spring load of the coil spring 63d, while the rotation speed of the left rear wheel 3RL stays within the predetermined parking lock prevention wheel rotation speed of 10 km/hr. If the shift lever is operated to the parking range in this state, rotation of the left rear wheel 3RL is locked while rotation of the right rear wheel 3RR is not locked according to the prior art parking lock device.

Locking rotation of only one of the pair of the drive wheels may result in unstable vehicle behavior and adversely affect the durability of the parking lock mechanisms 6.

The parking lock operation routine performed by the parking lock operation control part 10 according to this invention does not permit the parking lock mechanism 6 to perform a locking operation when the condition (1) is not satisfied.

For example, if the locking operation of the parking lock mechanism 6 is performed in a state where the wheel rotation speed of the right rear wheel 3RR exceeds the predetermined parking lock prevention wheel rotation speed of 10 km/hr while the wheel rotation speed of the left rear wheel 3RL stays within the predetermined parking lock prevention wheel rotation speed of 10 km/hr, the projection 62a of the parking pawl 62 is bounced by the tooth 61a of the ratchet wheel 61 in the right rear wheel 3RR so that the projection 62a is not able to engage with one of the grooves 61b of the ratchet wheel 61. The pusher 63c is therefore pushed back against the biasing force of the coil spring 63d and the rotation of the rotation shaft 33 is not locked. In contrast, in the left rear wheel 3RL, the projection 62a of the parking pawl 62 engages with one of the grooves 61b of the ratchet wheel 61, thereby locking the rotation of the rotation shaft 33.

According to this parking lock operation routine, since the locking operation of the parking lock mechanism 6 is not permitted as long as the condition (1) is not satisfied, there is no chance that the rotation of only one of the two drive wheels 3RR, 3RL is locked.

Even when the shift lever is operated to the parking range in a state where the rotation speeds of two drive wheels 3RR, 3RL are in the vicinity of the predetermined parking lock prevention wheel rotation speed of 10 km/hr, therefore, the vehicle behavior does not become unstable.

Further, since the prior art performs a locking operation of the parking lock mechanism irrespective of the deviation in the rotation speeds of the drive wheels, there is a possibility that a difference arises between the two drive wheels in the timing at which the projection of the parking pawl engages with one of the grooves of the ratchet wheel. Such a difference in the engaging timing may adversely affect the stability of the vehicle behavior.

According to this parking lock operation routine, however, the locking operation of the parking lock mechanism 6 is not permitted when the condition (2) is not satisfied. In other words, the locking operation of the parking lock mechanism 6 is not performed unless the rotation of the two drive wheels 3RR, 3RL is substantially synchronous. The locking conditions of the right and left drive wheels are thereby kept equal.

It is concluded that this parking lock operation routine ensures stable vehicle behavior in a specific parking lock condition that cannot be ensured by a mechanical inactivating mechanism.

In this parking lock operation routine, the locking operation of the parking lock mechanism 6 is not permitted unless the condition (1) and the condition (2) are satisfied simultaneously. However, it is possible to prevent a situation in which only one of the two drive wheels 3RR, 3RL is locked by determining only the condition (1), and permitting or prohibiting the locking operation of the parking lock mechanisms 6 accordingly. In this case also, a preferable effect in terms of stabilizing the vehicle behavior that the prior art device cannot achieve is obtained.

Similarly, it is possible to determine only the condition (2) and permit or prohibit the locking operation of parking lock mechanism 6 accordingly. In this case, a difference between the right and left drive wheels 3RR and 3RL in the lock timing can be prevented from arising and a preferable effect in terms of stabilizing the vehicle behavior that the prior art device cannot achieve is obtained.

In this embodiment, the parking lock mechanisms 6, the wheel rotation speed sensors 5R, 5L, and the parking lock operation control part 10 constitute the parking lock device.

Figure 6:
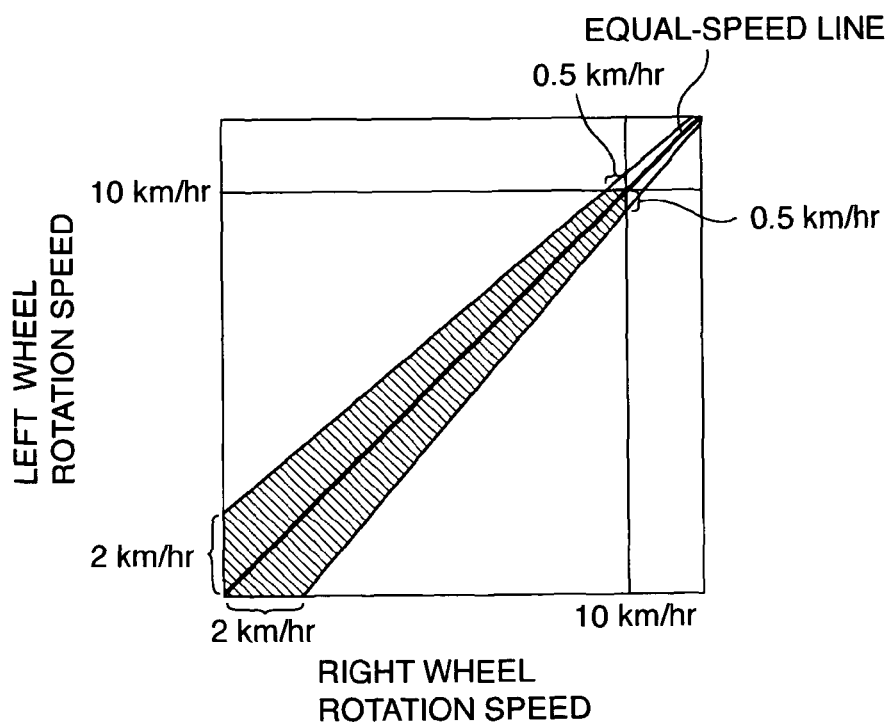
FIG. 6 is similar to FIG. 5, but shows a second embodiment of this invention.

Referring to FIG. 6, a second embodiment of this invention will be described.

According to this embodiment, a parking lock operation permission range map, the characteristics of which are shown in the figure, is stored in advance in the ROM of the vehicle controller CU instead of the parking lock operation permission range map of FIG. 6 referred to in the first embodiment.

The parking lock operation permission range map referred to in the first embodiment sets the parking lock operation permission range such that a difference between the rotation speeds of the right rear wheel 3RR and the left rear wheel 3RL is within the predetermined deviation of 0.5 km/hr, as shown in FIG. 5.

In this embodiment, as shown in FIG. 6, the parking lock operation permission range is enlarged as the wheel rotation speeds decrease. Specifically, the rotation speed of one of the drive wheels 3RR, 3RL is equal to the predetermined parking lock prevention wheel rotation speed of 10 km/hr, and the rotation speed of the other drive wheel 3RL (3RR) is limited within a range of 9.5-10 km/hr. In other words, when the wheel rotation speeds are in the vicinity of the predetermined parking lock prevention wheel rotation speed of 10 km/hr, the difference in the rotation speeds of the drive wheels 3RL, 3RR is substantially limited to the predetermined difference of 0.5 km/hr. This value is common to the parking lock operation permission range map shown in FIG. 5.

In contrast, with the map according to this embodiment, when the rotation speed of one of the drive wheels 3RR (3RL) is zero, the rotation speed of the other drive wheel 3RL (3RR) may fluctuate within a range of 0-2 km/hr. In other words, when the wheel rotation speed is in the vicinity of zero, the difference in the rotation speeds of the drive wheels 3RL and 3RR is allowed to be as large as 2 km/hr.

According to this embodiment, therefore, a parking lock operation performed at a low vehicle running speed can be completed earlier than in the first embodiment.

Figure 8:
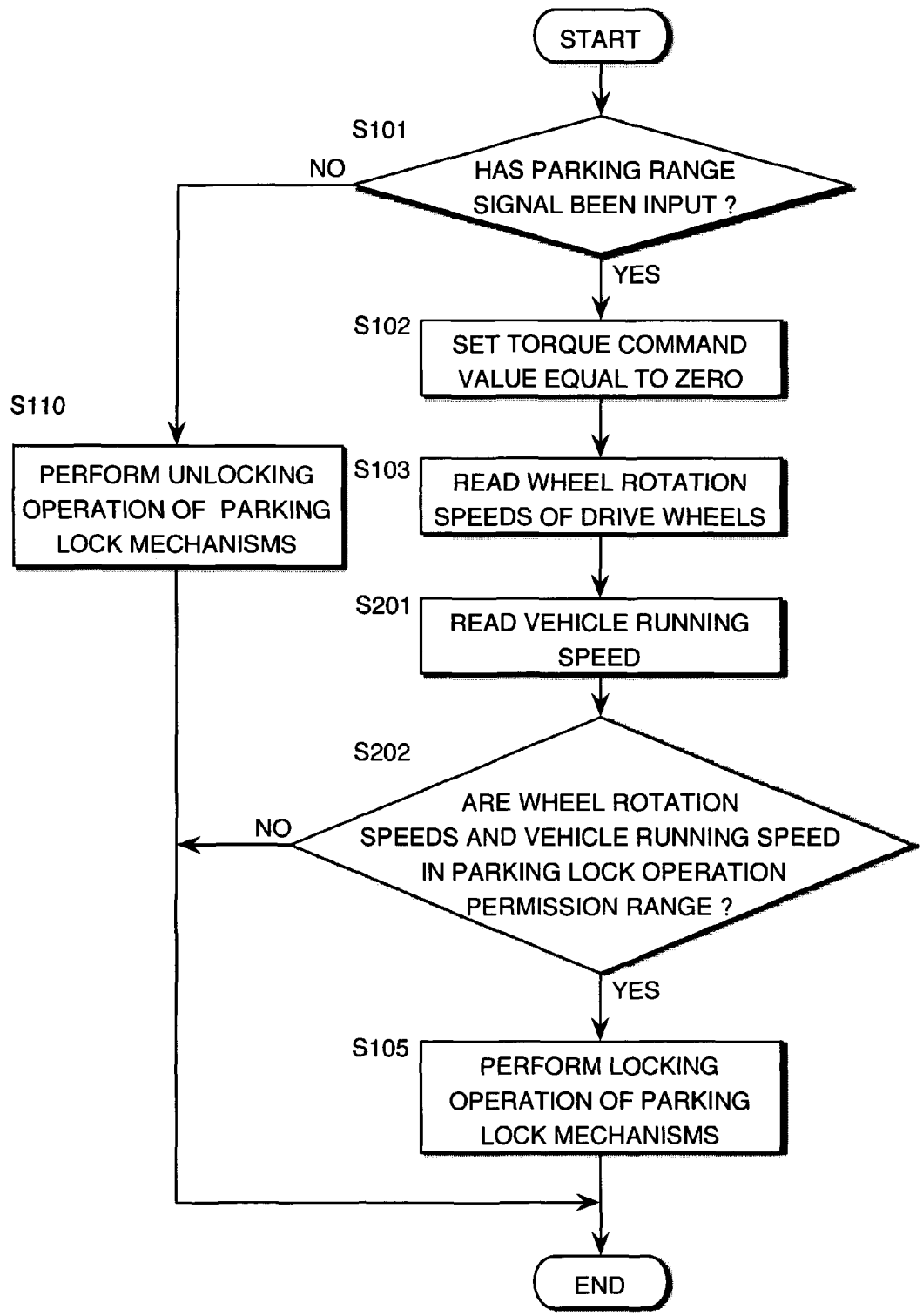
FIG. 8 is a flowchart describing a parking lock operation routine performed by a controller according to the third embodiment of this invention.
Figure 9:
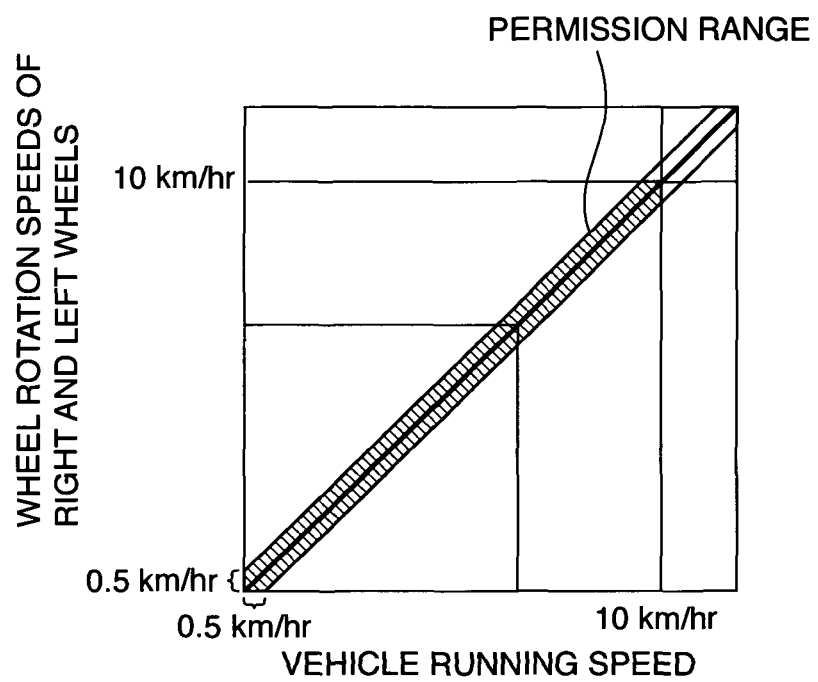
FIG. 9 is a diagram showing characteristics of a parking lock operation permission range map stored by the controller according to the third embodiment of this invention.

Referring to FIGS. 7-9, a third embodiment of this invention will be described.

The parking lock operation routine according to the first embodiment determines the permitting condition of the locking operation of the parking lock mechanism 6 in accordance with the rotation speeds of the right rear wheel 3RR and the left rear wheel 3RL, and the difference there-between. The parking lock operation routine according to this embodiment determines the permitting condition in view of a vehicle running speed also.

Referring to FIG. 7, to realize this control, the parking lock device further comprises a vehicle speed sensor 5a. The vehicle running speed detected by the vehicle speed sensor 5a is input into the vehicle controller CU as a signal.

The vehicle speed sensor 5a may be materialized in various fashions. For example, it is possible to provide the four wheels 3FR, 3FL, 3RR, 3RL with the wheel rotation speed sensor such that an average of the detected wheel rotation speeds is taken as the vehicle running speed. Alternatively, an average value of the wheel rotation speeds of the front wheels 3FR and 3FL, which are driven wheels, may be taken as the vehicle running speed. Further, the higher of the wheel rotation speeds of the front wheels 3FR and 3FL may be taken as the vehicle running speed. The vehicle running speed may be calculated by integrating the signals output from the front-aft acceleration sensor S7. Still further, the vehicle running speed may be calculated from output signals from a GPS sensor using the Global Positioning System.

Referring to FIG. 8, a parking lock operation routine according to this embodiment will be described.

The difference between this routine and the parking lock operation routine according to the first embodiment is that steps S201 and S202 are provided instead of the step S104. The other steps of the routine are common to the parking lock operation routine according to the first embodiment.

In the step S201, the parking lock operation control part 10 reads the vehicle running speed.

In the step S202, the parking lock operation control part 10 refers to a map, the characteristics of which are shown in FIG. 9, to determine if the rotation speed of the right rear wheel 3RR, the rotation speed of the left rear wheel 3RL, and the vehicle running speed are in the parking lock operation permission range corresponding to a hatched zone in FIG. 9. This map is stored previously in the ROM of the vehicle controller CU.

In the diagram of FIG. 9, an abscissa represents a vehicle running speed and an ordinate represents the rotation speeds of the right rear wheel 3RR and the left rear wheel 3RL. This diagram defines the locking operation permitting condition of the parking lock mechanism 6 as follows.

(1) Both of the rotation speeds of the right rear wheel 3RR and the left rear wheel 3RL are within the predetermined parking lock prevention wheel rotation speed of 10 km/hr, and (2A) the deviation between the wheel rotation speed of the right rear wheel 3RR and the vehicle running speed stays within a predetermined deviation of 0.5 km/hr and the deviation between the wheel rotation speed of the left rear wheel 3RL and the vehicle running speed stays within the predetermined deviation of 0.5 km/hr.

The condition (1) is equivalent to the condition (1) defined in the first embodiment. The effect brought about by the condition (1) in the first embodiment is also obtained in this embodiment.

The condition (2A) brings about a similar effect as the condition (2), but since the deviation between the wheel rotation speeds of the rear wheels 3RR, 3RL and the vehicle running speed is taken as a factor in determining the lock condition, coincidence of the vehicle behavior and the behavior of the rear wheels when the parking lock is activated can be further ensured.

Figure 10:
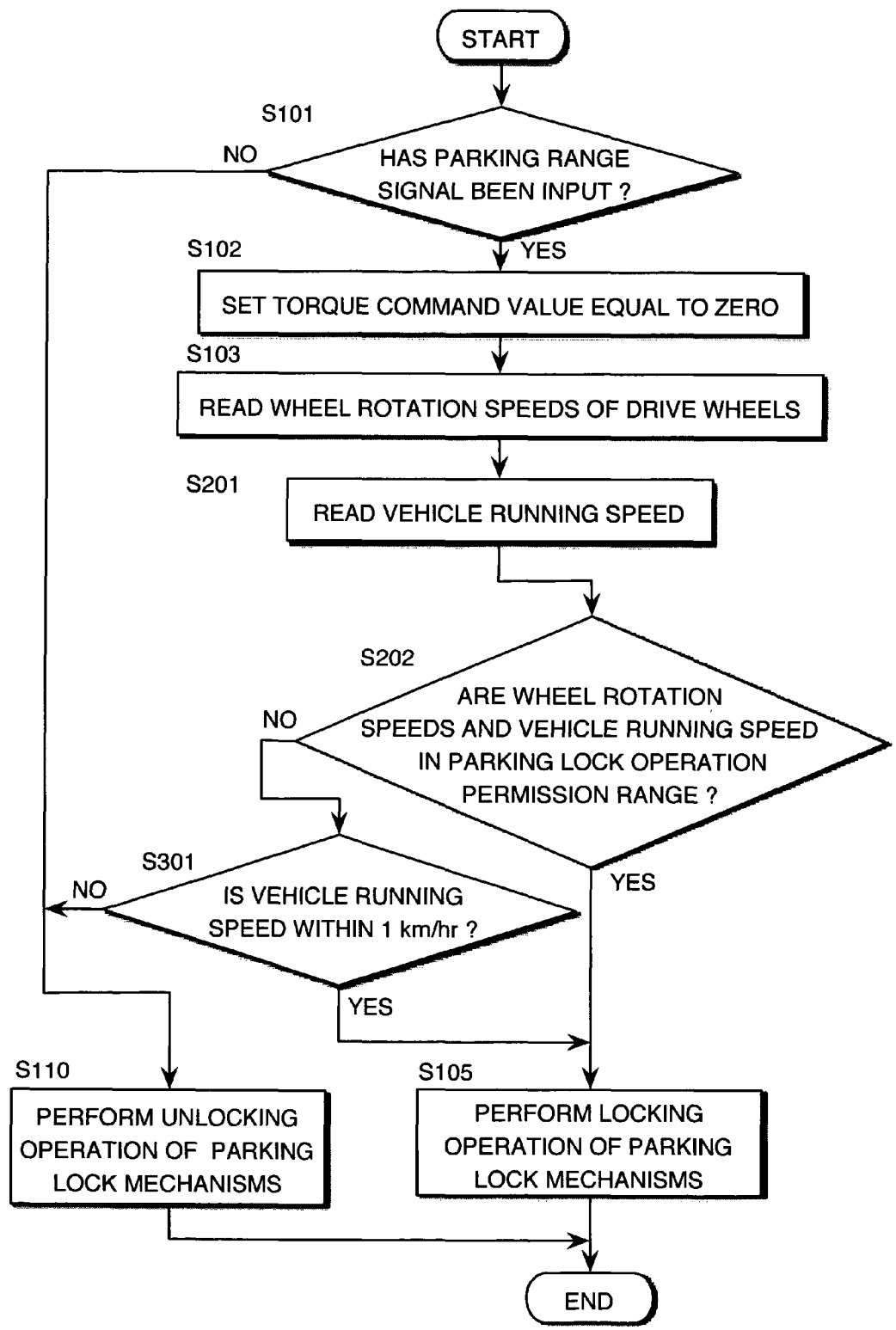
FIG. 10 is a flowchart describing a parking lock operation routine performed by a controller according to a fourth embodiment of this invention.

Referring to FIG. 10, a fourth embodiment of this invention will be described.

The hardware composition of this embodiment is identical to that of the third embodiment. According to this embodiment, however, the parking lock operation control part 10 performs a different parking lock operation routine from that of the third embodiment.

In the third embodiment, the permitting condition of the locking operation of the parking lock mechanism 6 is determined on the basis of a map having the characteristics shown in FIG. 9. The parking lock operation routine according to this embodiment mitigates the permitting condition of the locking operation of the parking lock mechanism 6 depending on the vehicle running speed.

Referring to FIG. 10, in the parking lock operation routine according to this embodiment, a step S301 is provided between the step S202 and the step S110 of the parking lock operation routine according to the third embodiment. The processing of the other steps is identical to that of the parking lock operation routine according to the third embodiment.

In the step S301, the parking lock operation control part 10 determines if the vehicle running speed is within 1 km/hr. If the determination is affirmative, the parking lock operation control part 10 performs the locking operation of the parking lock mechanisms 6 in the step S105. If the determination is negative, the parking lock operation control part 10 performs the unlocking operation of the parking lock mechanism 6 in the step S110 and terminates the routine.

In this embodiment, the condition (1) of the third embodiment is applied without modification but the condition (2A) is slightly modified to determine the permitting conditions of the locking operation of the parking lock mechanism 6. Specifically, even when the deviation between the vehicle running speed and the wheel rotation speed of the right rear wheel 3RR or the deviation between the vehicle running speed and the wheel rotation speed of the left rear wheel 3RL exceeds the predetermined deviation of 0.5 km/hr, the locking operation of the parking lock mechanisms 6 of the right rear wheel 3RR and the left rear wheel 3RL is permitted as long as the vehicle running speed is within 1 km/hr. When the vehicle running speed is higher than 1 km/hr, on other hand, the locking operation of the parking lock mechanisms 6 of the right rear wheel 3RR and the left rear wheel 3RL is prohibited.

Even when the deviation between the vehicle running speed and the wheel rotation speed of the right rear wheel 3RR or the deviation between the vehicle running speed and the wheel rotation speed of the left rear wheel 3RL is higher than the predetermined deviation of 0.5 km/hr, the locking operation of the parking lock mechanism 6 does not make the vehicle behavior unstable as long as the vehicle running speed is within 1 km/h. According to this embodiment, therefore, a parking lock operation in a low vehicle speed range can be accomplished earlier than in the third embodiment.

Figure 11:
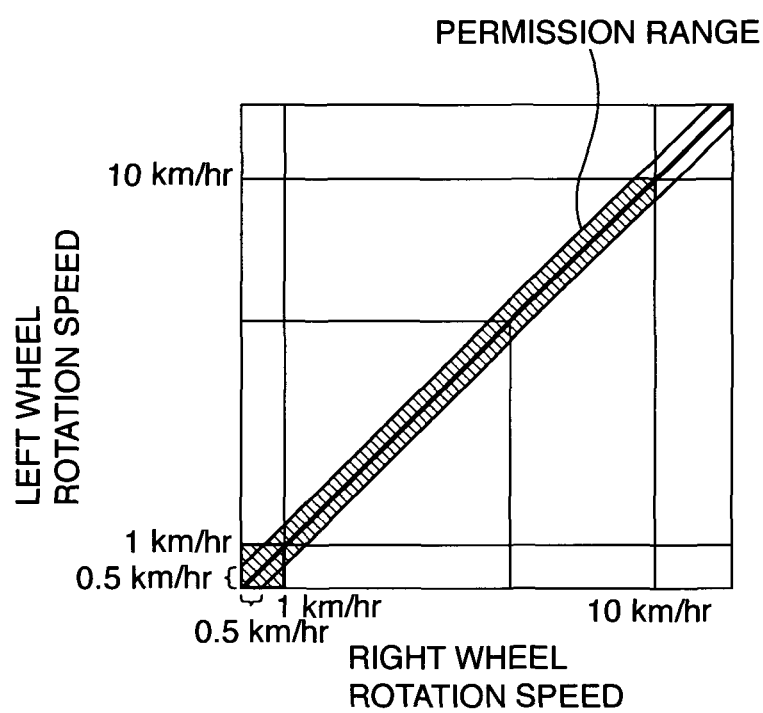
FIG. 11 is a diagram showing characteristics of a parking lock operation permission range map stored by a controller according to a fifth embodiment of this invention.

Referring to FIG. 11, a fifth embodiment of this invention will be described.

The hardware composition of this embodiment is identical to that of the first embodiment. The parking lock operation routine performed by the parking lock operation control part 10 is basically identical to that of the first embodiment. In this embodiment, however, the contents of the map referred to in the step S104 are different from those of the map used in the third embodiment.

In this embodiment, a map having the characteristics shown in FIG. 11 is used instead of the map having the content shown in FIG. 5.

In the diagram of FIG. 11, when the wheel speed of the right rear wheel 3RR and the wheel speed of the left rear wheel 3RL are both within 1 km/hr, the locking operation of the parking lock mechanisms 6 of the right rear wheel 3RR and the left rear wheel 3RL is permitted even when the difference between the wheel speeds of the right rear wheel 3RR and the left rear wheel 3RL exceeds the predetermined difference of 0.5 km/hr.

In other words, the condition (2) of the first embodiment is mitigated in a low wheel speed range of the right rear wheel 3RR and the left rear wheel 3RL.

By applying this map instead of the map corresponding to FIG. 5 of the first embodiment, a parking lock operation in a low vehicle speed range can be accomplished in a short time, as in the case of the second and the fourth embodiment.

Figure 13:
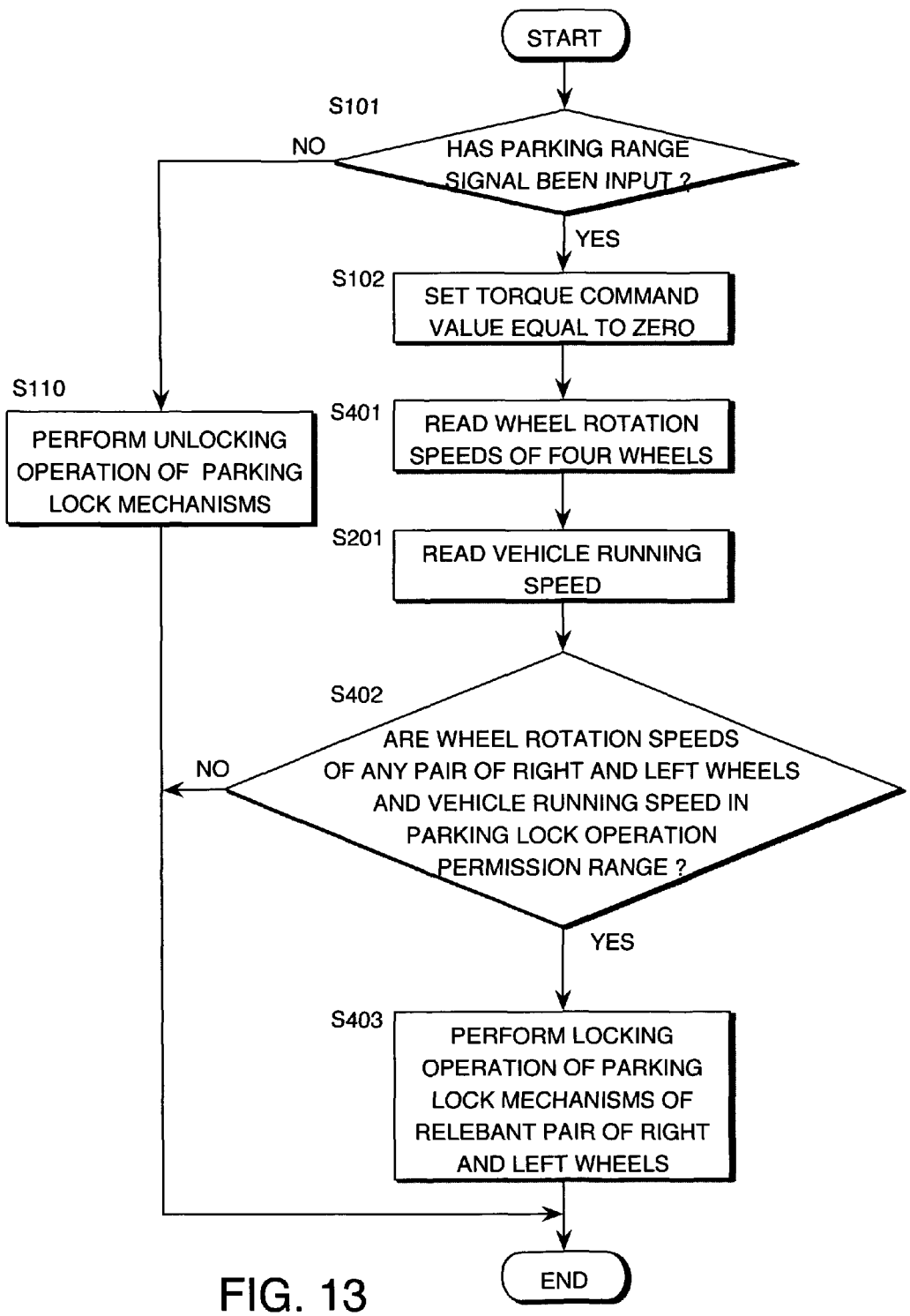
FIG. 13 is a flowchart describing a parking lock operation routine performed by a controller according to the sixth embodiment of this invention.

Referring to FIG. 12 and FIG. 13, a sixth embodiment of this invention will be described.

In the first to fifth embodiments, the vehicle is a so-called two-wheel drive vehicle having the right rear wheel 3RR and the left rear wheel 3RL as drive wheels and the right front wheel 3FR and the left front wheel 3FL as driven wheels. The parking lock mechanism 6 is provided for the drive wheels, i.e., the right rear wheel 3RR and the left rear wheel 3RL, only.

In contrast, the vehicle to which this embodiment is applied is a so-called four-wheel-drive vehicle having four wheels 3FR, 3FL, 3RR, 3RL that are driven by electric motors 1FR, 1FL, 1RR, 1RL, respectively. The parking lock mechanism 6 is provided for each of the four wheels 3FR, 3FL, 3RR, 3RL. Also, the wheel rotation speed sensors 5FR, 5FL, 5RR, 5RL are provided for the four wheels 3FR, 3FL, 3RR, 3RL, respectively.

According to this embodiment, the locking operation of the parking lock mechanism 6 is performed in a pair of one of the right front wheel 3FR and the right rear wheel 3RR and one of the left front wheel 3FL and the left rear wheel 3RL. Specifically, the locking operation of the parking lock mechanism 6 is performed for one of the pairs shown in the following tables.

TABLE 1

| WHEEL | RIGHT | LEFT |
| --- | --- | --- |
| FRONT | 0 | 0 |
| REAR | — | — |

TABLE 2

| WHEEL | RIGHT | LEFT |
| --- | --- | --- |
| FRONT | — | — |
| REAR | 0 | 0 |

TABLE 3

| WHEEL | RIGHT | LEFT |
| --- | --- | --- |
| FRONT | 0 | — |
| REAR | — | 0 |

TABLE 4

| WHEEL | RIGHT | LEFT |
| --- | --- | --- |
| FRONT | — | 0 |
| REAR | 0 | — |

The parking lock operation control part 10 performs a parking lock operation routine shown in FIG. 13 instead of the parking lock operation routine according to the third embodiment shown in FIG. 8. The difference between this parking lock operation routine and the parking lock operation routine shown in FIG. 8 is that the determination of the difference in the wheel rotation speeds is performed not for the rear two wheels 3RR, 3RL, but for the four wheels 3FR, 3FL, 3RR, 3RL. For this purpose, steps S401, S402, and S403 are provided in the parking lock operation routine according to this embodiment instead of the steps S103, S202, and S105 of FIG. 8.

In the step S401, the parking lock operation control part 10 reads wheel speeds of the four wheels 3FR, 3FL, 3RR, 3RL.

In the step S402, the parking lock operation control part 10 determines a permitting condition of the locking operation of the parking lock mechanisms 6 on the basis of the wheel speeds of the four wheels 3FR, 3FL, 3RR, 3RL and the vehicle running speed read in the step S201 by referring to the map having the characteristics shown in FIG. 9.

The determination is performed for the pair of the right front wheel 3FR and the left front wheel 3FL shown in TABLE-1, the pair of the right rear wheel 3RR and the left rear wheel 3RL shown in TABLE-2, the pair of the right front wheel 3FR and the left rear wheel 3RL shown in TABLE-3, and the pair of the right rear wheel 3RR and the left front wheel 3FL shown in TABLE-4, respectively.

The parking lock operation control part 10 then determines if there is a pair that satisfies the permitting condition defined in the map of FIG. 9.

In the step S402, if a pair of wheels that satisfies the condition defined in the map of FIG. 9 exists, the parking lock operation control part 10 performs the locking operation of the parking lock mechanisms 6 on the relevant pair in a step S403. It should be noted that when plural pairs that satisfy the condition defined in the map of FIG. 9 exist, a pair of wheels is selected from the plural pairs according to a predetermined priority.

In the step S302, when no pair of wheels satisfies the condition defined in the map of FIG. 9, the parking lock operation control part 10 terminates the routine without performing the locking operation of the parking lock mechanisms 6.

Since any of the above pairs is constituted by right and left wheels, there is no possibility that the locking operation will be performed only for the right wheels or the left wheels.

According to this embodiment, the number of pairs of wheels on which the locking operation of the parking lock mechanisms 6 is determined is increased and the parking lock operation can be accomplished in a short time without inducing unstable vehicle behavior.

Figure 14:
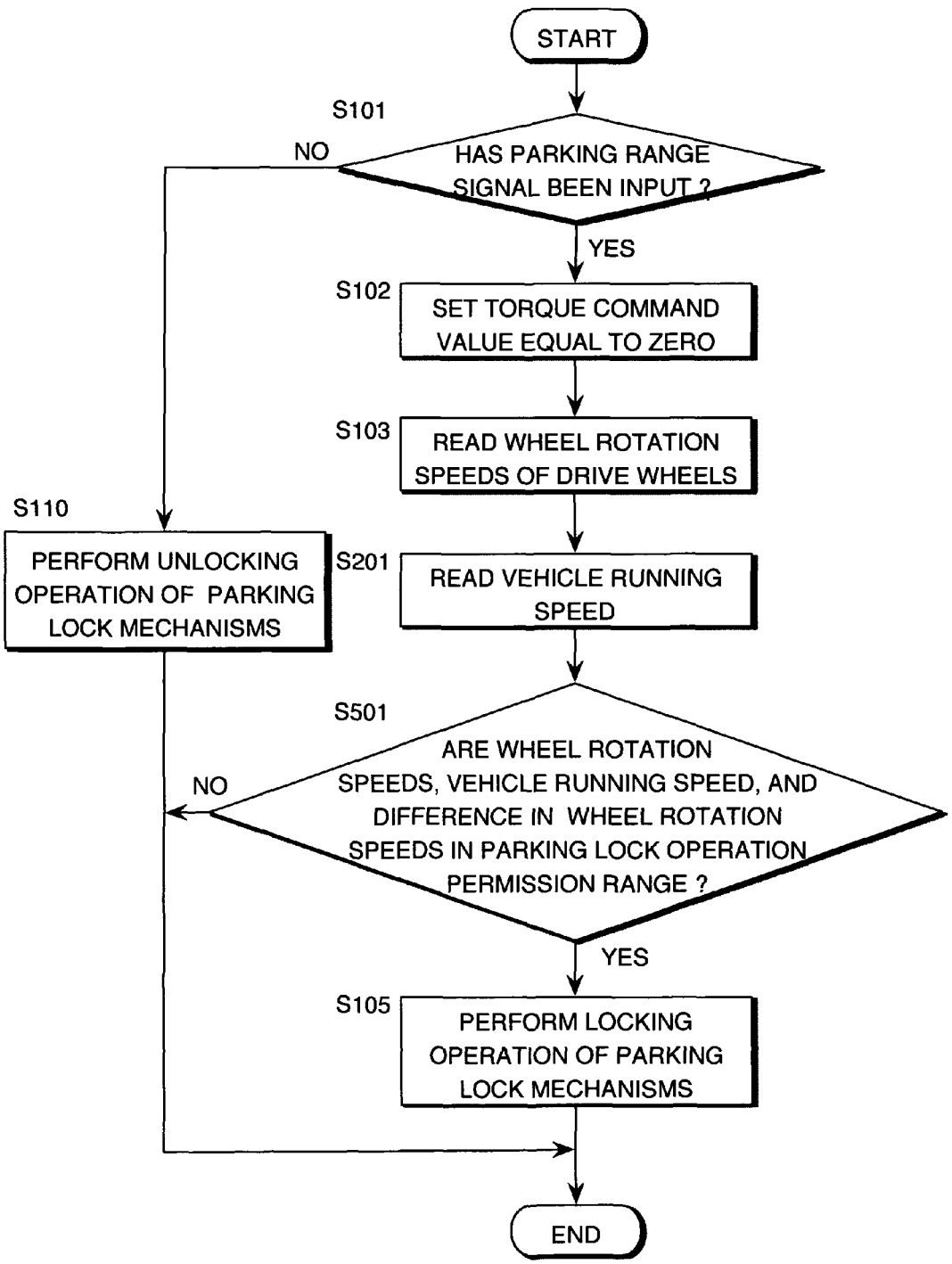
FIG. 14 is a flowchart describing a parking lock operation routine performed by a controller according to a seventh embodiment of this invention.

Referring to FIG. 14, a seventh embodiment of this invention will be described.

Although this embodiment seems to be similar to the third embodiment, a part of the parking lock operation routine performed by the parking lock operation control part 10 is different from the parking lock operation routine of the third embodiment.

Referring to FIG. 14, in the parking lock operation routine according to this embodiment, a step S501 is provided instead of the step S202 of the routine in FIG. 8 according to the third embodiment.

In the step S202 of the parking lock operation routine according to the third embodiment, the parking lock operation control part 10 determines if the wheel rotation speed of the right rear wheel 3RR and the wheel rotation speed of the left rear wheel 3RL are in the hatched zone in FIG. 9.

In the step S501 of the parking lock operation routine according to this embodiment, in addition to the same determination as in the step S202, the parking lock operation control part 10 further determines if a difference between the wheel rotation speed of the right rear wheel 3RR and the wheel rotation speed of the left rear wheel 3RL is within a predetermined difference.

The parking lock operation control part 10 performs the locking operation of the parking lock mechanisms 6 in the step S105 only when both of these two conditions are satisfied. When at least one of the two conditions is not satisfied, the parking lock operation control part 10 terminates the routine without performing the locking operation of the parking lock mechanisms 6.

According to this parking lock operation routine, since the permitting condition of the locking operation of the parking lock mechanisms 6 is determined on the basis of the difference between the wheel rotation speeds in addition to the deviation between the wheel speeds and the vehicle running speed, the vehicle behavior in response to the locking operation of the parking lock mechanisms 6 becomes more stable than in the case of the first-sixth embodiments.

The contents of Tokugan 2009-54962, with a filing date of Mar. 9, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the first to fifth embodiments and the seventh embodiment described above are directed to a rear drive vehicle in which each of the right rear wheel and the left rear wheel is provided with an electric motor and a parking lock mechanism. However, these embodiments can be applied to a front drive vehicle in which each of the right front wheel and the left front wheel is provided with an electric motor and a parking lock mechanism, or a four-wheel-drive vehicle in which each of the four wheels is provided with an electric motor and a parking lock mechanism.

Although the embodiments described above are directed to an electric-drive vehicle, this invention can be applied to any type of vehicle such as a hybrid-drive electric vehicle or a vehicle driven by an internal combustion engine as long as the vehicle has right and left wheels each of which is provided with a parking lock mechanism.

FIELD OF THE INVENTION

As described above, this invention is suited for control of a parking lock device of an electric-drive vehicle but not limited thereto.

The embodiments of this invention in which an exclusive property or privilege is claimed are defined as follows:

The invention claimed is:

1. A parking lock device for a vehicle having a right wheel and a left wheel, comprising:
    a right parking lock mechanism which locks a rotation of the right wheel, the right parking lock mechanism comprising a locking operation prevention mechanism which mechanically prevents a locking operation of the right parking lock mechanism when a wheel rotation speed of the right wheel exceeds a predetermined parking lock prevention wheel rotation speed;
    a left parking lock mechanism which locks a rotation of the left wheel, the left parking lock mechanism comprising a locking operation prevention mechanism which mechanically prevents a locking operation of the left parking lock mechanism when a wheel rotation speed of the left wheel exceeds the predetermined parking lock prevention wheel rotation speed;
    a rotation speed sensor which detects a wheel rotation speed of the right wheel;
    a rotation speed sensor which detects a wheel rotation speed of the left wheel; and
    a programmable controller programmed to execute the following steps when a shift lever of the vehicle shifts to a parking range:
        determining if a predetermined parking lock permitting condition is satisfied on the basis of the wheel rotation speed of the right wheel and the wheel rotation speed of the left wheel;
        preventing the locking operation of both of the right parking lock mechanism and the left parking lock mechanism when the predetermined parking lock permitting condition is not satisfied; and
        determining that the predetermined parking lock permitting condition is not satisfied when a difference between the wheel rotation speed of the right wheel and the wheel rotation speed of the left wheel is greater than a predetermined speed difference.

2. The parking lock device as defined according to claim 1, wherein the device further comprises a sensor which detects a vehicle running speed and the controller is further programmed to increase the predetermined speed difference as the vehicle running speed decreases below a predetermined vehicle running speed.

3. The parking lock device as defined according to claim 1, wherein the device further comprises a sensor which detects a vehicle running speed, and the controller is further programmed to determine that the predetermined parking lock permitting condition is satisfied when the vehicle running speed is lower than a predetermined vehicle running speed.

4. A parking lock device for a vehicle having a right wheel and a left wheel, comprising:
    a right parking lock mechanism which locks a rotation of the right wheel, the right parking lock mechanism comprising a locking operation prevention mechanism which mechanically prevents a locking operation of the right parking lock mechanism when a wheel rotation speed of the right wheel exceeds a predetermined parking lock prevention wheel rotation speed;
    a left parking lock mechanism which locks a rotation of the left wheel, the left parking lock mechanism comprising a locking operation prevention mechanism which mechanically prevents a locking operation of the left parking lock mechanism when a wheel rotation speed of the left wheel exceeds the predetermined parking lock prevention wheel rotation speed;
    a rotation speed sensor which detects a wheel rotation speed of the right wheel;
    a rotation speed sensor which detects a wheel rotation speed of the left wheel;
    a running speed sensor which detects a vehicle running speed; and
    a programmable controller programmed to execute the following steps when a shift lever of the vehicle shifts to a parking range:
        determining if a predetermined parking lock permitting condition is satisfied on the basis of the wheel rotation speed of the right wheel and the wheel rotation speed of the left wheel;
        preventing the locking operation of both of the right parking lock mechanism and the left parking lock mechanism when the predetermined parking lock permitting condition is not satisfied; and
        determining that the predetermined parking lock permitting condition is not satisfied when one or both of a deviation between the wheel running speed of the right wheel and the vehicle running speed and a deviation between the wheel running speed of the left wheel and the vehicle running speed is greater than a predetermined speed deviation.

5. The parking lock device according to claim 4, wherein the right wheel comprises plural wheels each of which is provided with a parking lock mechanism, the left wheel comprises plural wheels each of which is provided with a parking lock mechanism, and the controller is further programmed to determine that the predetermined parking lock permitting condition is satisfied when a deviation between one of the wheel rotation speeds of the right wheels and the vehicle running speed and a deviation between one of the wheel rotation speeds of the left wheels and the vehicle running speed are both within the predetermined speed deviation, and permit the locking operation of the parking lock mechanism of the relevant right wheel and the locking operation of the parking lock mechanism of the relevant left wheel accordingly.

6. The parking lock device according to claim 5, wherein the vehicle comprises a four-wheel-drive vehicle that comprises two right wheels and two left wheels.

7. The parking lock device according to claim 1, wherein
the right wheel is constituted by a drive wheel driven by an electric motor,
the left wheel is constituted by a drive wheel driven by an electric motor,
the right parking lock mechanism comprises a right ratchet wheel which rotates together with the right wheel, a right parking pawl which prevents the right ratchet wheel from rotating by engaging with the right ratchet wheel, and a right actuator which drives the right parking pawl between an engaged position and a non-engaged position with the right ratchet wheel,
the locking operation prevention mechanism of the right parking lock mechanism comprises a right coil spring which is disposed between the right actuator and the right parking pawl to transmit a driving force of the right actuator to the right parking pawl in a limited state based on a spring load thereof,
the left parking lock mechanism comprises a left ratchet wheel which rotates together with the left wheel, a left parking pawl which prevents the left ratchet wheel from rotating by engaging with the left ratchet wheel, and a left actuator which drives the left parking pawl between an engaged position and a non-engaged position with the left ratchet wheel, and
the locking operation prevention mechanism of the left parking lock mechanism comprises a left coil spring which is disposed between the left actuator and the left parking pawl to transmit a driving force of the left actuator to the left parking pawl in a limited state based on a spring load thereof.

8. The parking lock device according to claim 1, wherein the vehicle comprises a mode selection switch which detects a shifting operation of the shift lever to a parking range, and the controller is further programmed to determine if the predetermined parking lock permitting condition is satisfied only when the mode selection switch has detected the shifting operation of the shift lever to the parking range.

* * * * *